Patented Sept. 18, 1934

1,974,010

UNITED STATES PATENT OFFICE 1,974,010

BASE-EXCHANGE MATERIAL AND PROCESS FOR THE PRODUCTION THEREOF

Carl Christian Leopold Gether Budde, Copenhagen, Denmark

No Drawing. Application January 5, 1931, Serial No. 506,599½. In Denmark January 7, 1930

8 Claims. (Cl. 23—112)

Base-exchanging substances as they occur in nature are for the most part unable to offer resistance to water, and are therefore unsuitable as base-exchangers. In order to improve their properties, the substances are subjected to burning, whereby the gels present lose the greater part of their water content. It is true that the gels become to a certain extent rehydrated owing to the action of electrolyte-containing water. This re-hydration is a condition for the attainment of the greatest possible base-exchanging efficiency. Meanwhile, if the burning is suitably adjusted, the re-hydration does not reach a point where the substances thereby lose their solid structure.

Burning is, however, irrational, in as much as the substances thereby permanently lose in base-exchanging capacity. Thus, a base-exchanging clay which in nature can take up more than 2% of CaO by means of base-exchange, loses more than half its base-exchanging capacity if it be burnt sufficiently to ensure its subsequent non-suspension in water. Burning is, moreover, difficult, as the measure of burning has to be extremely carefullly performed. Slight deviations to the one side or the other of the exact amount of burning to be observed are attended with fatal results. This also applies to a certain extent to artificially prepared base-exchangers.

These shortcomings are avoided by means of this invention. According to the invention, natural or artificial base-exchangers are completely or in part stabilized by means of a binding material. In the stabilized product the binding material closely surrounds the particles of the base-exchanger, thereby preventing its dissolving or suspending in water.

In employing the invention with such artificial base-exchangers the binding material may be added to the one or the other of the soluble components before mixing, to produce the base-exchanger. It may be added at any point during manufacture.

The binding material to be used must, as it occurs in the finished stabilized base-exchanger, be in the possession of the following properties:
(1) Insolubility, as far as possible, in water;
(2) insensibility to acids, alkalis and other substances which might be present in the water;
(3) permeability to water and the ions under consideration; and (4) sufficient efficiency, so that only a comparatively small quantity is needed for stabilization.

Certain organic substances having a high molecular weight, especially hydrates of cellulose, have proved specially suitable to meet these requirements.

One mode of performing the invention consists, in the first place, of converting the cellulose into xanthate according to the well-known viscose-process. In this case, the base-exchanging substances or, where artificial base-exchanging substances are employed, one or several components thereof, may as occasion demands be mixed with the xanthate solution, and the mass left to coagulate, or the coagulation may be brought about in a known manner by means of heat or precipitants.

The salts, etc. so formed are then washed out with water, preferably soft water, in order to avoid clogging the pores of the mass. There remains the base-exchanging substance, permeated with hydrate of cellulose. The mass may be dried at ordinary temperatures or by means of heat before or after washing. Moreover, the mass can be reduced, before or after washing and drying, to particles, of a mesh suitable for the purpose for which the base-exchanger is to be employed.

Another method of performing the invention is to convert the cellulose to xanthate and thereafter in a known manner to hydrate of cellulose, which is mixed before or after washing with the base-exchanging substance. Drying and/or crushing the finished mass may be carried out as above described.

A third method consists in the direct conversion of the cellulose to the hydrate by vigorous mechanical treatment with water, thereafter adding this to the base-exchanging substance or, in the case of artificial base-exchanging substances, one or more of its component parts. This addition may take place at any point of the hydrating process. In this method with natural or finished base-exchanging products washing is unnecessary; drying and/or crushing of the finished mass may be performed as above described.

One of the reasons for cellulose being especially suitable as a binding material and protective medium is its powers of resistance to chemical action. Furthermore, it is extraordinarily effective. For example, in the case of base-exchanging clay an effective binding was obtained with a quantity of cellulose not exceeding 10% of the weight of the clay. However, any proportion of binding material to the base-exchanging substance falls within the scope of this invention.

Of other binding materials suitable for the performance of the invention, albeit to a somewhat less degree, may be mentioned for example: casein, glue or gelatine and similar substances such as certain resins and bitumen. The method of stabilization is in all these cases the same, the base-exchanger or, in the case of artificial base-exchangers, one or more of their component parts, being mixed with the binding material in, for example, soluble or suspended form or in the form of a gel, whereupon the binding material, if soluble in water, is rendered insoluble in a known manner, and the mixture, if necessary, freed by washing from its water soluble components and reduced to grains of suitable size.

Example 1

The mixture for stabilization consists of a base-exchanging clay, which in the natural state is capable of exchanging 1.5% CaO and the analysis of which is as follows:

|  | Per cent |
| --- | --- |
| Loss by ignition | 8.11 |
| $SiO_2$ | 65.75 |
| $Fe_2O_3$ | 5.43 |
| $Al_2O_3$ | 16.19 |
| CaO | 1.48 |
| MgO | 0.81 |
| Alkali (difference) | 2.24 |

10 kg. of this clay is suspended in 10 kg. of water.

700 g. cellulose are converted to xanthate according to the process given by Cross and Bevan in their "Researches on Cellulose" by the addition of water in such a quantity that a total quantity of 5 kg. viscose is formed.

This quantity of viscose is then mixed with the clay suspended in water and the mass allowed to stand and coagulate at a temperature of 25° C. The gelatinous mass is then cut into pieces of suitable size washed and dried at 60–80° C., and subsequently crushed and sieved.

Example 2

The substance for stabilization consists of a base-exchanging clay, capable in the natural state of exchanging 1.0% CaO. Its analysis is:

|  | Per cent |
| --- | --- |
| Loss by ignition (org. and chem. comb. $H_2O$) | 17.00 |
| $Al_2O_3$ | 10.60 |
| Iron oxide (calculated as $Fe_2O_3$) | 5.10 |
| CaO | 2.60 |
| MgO | 0.76 |
| $Na_2O$ | 2.60 |
| $K_2O$ | 1.44 |
| $H_2O$ | 8.80 |
| Chlorine and sulphate residue (difference) | 2.20 |

This clay is crushed and sieved to a mesh 16–40 (American normal sieve), whereupon 140 gr. is moistened with a solution of 3 gr. of casein and 0.5 gr. of calcined soda ash in 150 ccm. of water. It is then dried at 40–50° C. It is then moistened with a solution of 20 ccm. formalin (40%) in 150 ccm. of water. It is again dried at a temperature of 40–50° C., whereupon the clay thus treated is allowed to stand for some hours at 80–100° C.

In both cases the resulting product is completely stable, and undergoes no alteration, even when exposed to running water for several months, neither is it altered by frequent regenerations. Its exchanging capacity remains likewise unaltered.

Example 3

300 gr. of crushed clay is impregnated with fluid phenol resin, prepared, for example, from mixture of 22 ccm. of raw phenol, 22 ccm. of formalin (40%), and 15% concentrated solution of ammonia. The phenol resin is then condensed, for example, by exposing the mixture for 4 hours to a temperature of 150° C.

Example 4

Clay is intimately mixed with bakelite A (5–10%) in a roller mill, for example, the mixture pressed warm, and if necessary exposed to a further condensation process, as already described. The hard mass is then crushed and sieved.

Example 5

Clay is intimately mixed with pitch, asphalt or similar bituminous substances (10–20%), in a roller mill for instance. The mixture is then pressed warm, and the hard mass is crushed and sieved after cooling.

Example 6

Granulated clay is covered with tar and exposed for an hour, for instance, to a temperature of 110° C. The excess of tar is then removed centrifugally or by some similar process.

Example 7

100 gr. granulated clay is moistened with a solution of 10 gr. of sugar in 50 ccm. of water. The sugar is then carbonized, the mixture being, for instance, exposed for two hours to a temperature of 300° C.

Example 8

100 gr. of finely ground clay is kneaded together with a solution of 10 gr. of sugar in 75 ccm. of water, the mass is then dried, crushed, and sieved. The sugar is hereupon carbonized, as already described.

Example 9

The hydroxides of aluminum and iron are precipitated by neutralizing a solution of, for instance, 50 gr. aluminum sulphate and 50 gr. of ferric chloride in 1000 ccm. of water. The hydroxides are then removed from the liquid by filtering, centrifuging, or the like, and kneaded together with 200 gr. of ground clay. The mass is then dried, crushed, and sieved. It is of great importance that in this process the material is not subjected to burning but only dried, burning being to a certain extent detrimental to the base-exchanging capacity of the artificially produced base-exchanging substance.

Example 10

A base exchanging material, e.g. is subjected to a heat treatment in a suitable furnace with fumes of a volatile compound preferably together with air or steam or both. The base exchanging material may be in the form of grains of a size suitable for its employment to base exchanging. A quantity of the volatile alkali compound, e.g. sodium chloride is placed in the hottest part of the furnace and the fumes formed by this compound may be passed over or through the base-exchanging material, placed in another part of the furnace. The temperature of the base exchanging material during the treatment may preferably be 650-700° C. The alkali containing fumes will then enter into reaction with the surface parts of the grains of base exchanging material and possibly penetrate into said grains to act upon the material in the inner part of the grains forming with the silicates a fusible substance, which will act as a binding material. The reaction may be measured by measuring the amount of hydrogen chloride contained in the air or fumes issuing from the furnace. Only a slight amount of the silicates of the base exchanging material should be converted into the fusible alkali compound. The exact amount depends upon the raw material and the desired product. By variation of the amount of alkali which the raw material is permitted to take up the ratio of the base exchanging capacity to the hardness or resistibility of the material can be changed and said ratio can be made substantially more favorable than in case of burning the base exchanging material in the known way. This is due to the much shorter time required at equal temperature to bind the particles of the material together by this process than required for converting clay itself into a body of sufficient resistancy as in the known processes of stabilizing base-exchanging clay by burning. In the present process most of the clay in the interior parts of the grains will remain substantially unconverted during the treatment with alkali and does not even decrease in base-exchanging capacity to any substantial extent. The amount of reaction is always so slight that the base exchanging material when treated will not show any visible glaze as by the known salt glazing of pottery.

In many cases pressure may also be employed subsequently, as mentioned in Examples 4 and 6, in order to increase the solidity of the final product.

I claim:

1. A process for the stabilization of base-exchanging substances comprising the step of impregnating a base-exchanging substance with a bituminous material.

2. A process for the stabilization of base-exchanging substances, comprising the steps of mixing a base-exchanger with hydrate of cellulose in a moist state and drying the mixture.

3. A process for stabilizing base-exchangers, comprising the steps of converting cellulose into xanthate, mixing the cellulose xanthate with a base-exchanging substance and subjecting the mixture to a treatment which effects the conversion of the xanthate into hydrate of cellulose.

4. A process for the stabilization of base-exchangers, comprising the steps of mixing a base-exchanger with casein and subjecting the mixture to a treatment with formaldehyde.

5. A process for the stabilizing of base-exchangers, comprising the steps of mixing the base-exchanger with a resinous substance and treating the mixture so as to make the resinous substance hard and resistant to water.

6. A granular base-exchanging substance the particles of which are surrounded and permeated with an organic binding material.

7. A process for the production of a granular base-exchanging substance comprising the steps of dissolving an organic binding material in hydrosol, precipitating a hydrogel, eliminating water from the gel and granulating the solid gel.

8. A process for the production of granular base-exchanging substances, comprising the steps of mixing a binding material with one of the components from which an artificial base-exchanger can be prepared, bringing the mixture together with the other component of the base-exchanger to throw down the gel containing a proportion of the binding material, separating said gel eliminating water therefrom and grinding and hardening the binding material.

CARL CHRISTIAN LEOPOLD
GETHER BUDDE